US008972481B2

(12) United States Patent
Schrempp et al.

(10) Patent No.: US 8,972,481 B2
(45) Date of Patent: Mar. 3, 2015

(54) PLAYLIST GENERATION METHOD AND APPARATUS

(75) Inventors: James B. Schrempp, Saratoga, CA (US); Vance Ikezoye, Los Gatos, CA (US); Erling H. Wold, El Cerrito, CA (US); Thomas L. Blum, San Francisco, CA (US); Douglas F. Keislar, Berkeley, CA (US); James A. Wheaton, Sebastopol, CA (US)

(73) Assignee: Audible Magic, Inc., Los Gatos, CA (US)

( * ) Notice: Subject to any disclaimer, the term of this patent is extended or adjusted under 35 U.S.C. 154(b) by 1339 days.

(21) Appl. No.: 09/910,680

(22) Filed: Jul. 20, 2001

(65) Prior Publication Data

US 2003/0018709 A1    Jan. 23, 2003

(51) Int. Cl.
| *G06F 15/16* | (2006.01) |
| *H04N 21/254* | (2011.01) |
| *G10L 15/26* | (2006.01) |
| *H04N 7/16* | (2011.01) |
| *H04L 29/08* | (2006.01) |

(52) U.S. Cl.
CPC ............ *H04N 21/254* (2013.01); *G10L 15/265* (2013.01); *H04N 7/16* (2013.01); *H04L 67/16* (2013.01); *H04L 69/329* (2013.01)
USPC ............................. 709/203; 709/201; 709/231

(58) Field of Classification Search
CPC ......... H04N 7/16; H04L 67/16; H04L 69/329
USPC ............... 704/270, 235; 709/203, 223; 707/1; 714/38; 705/51, 55, 310, 58
See application file for complete search history.

(56) References Cited

U.S. PATENT DOCUMENTS

| 3,919,479 | A |   | 11/1975 | Moon et al. ................. 179/1 SB |
| 4,230,990 | A | * | 10/1980 | Lert et al. ........................ 725/22 |
| 4,449,249 | A |   | 5/1984  | Price ............................... 455/45 |
| 4,450,531 | A |   | 5/1984  | Kenyon et al. ............... 364/604 |
| 4,454,594 | A |   | 6/1984  | Hefron et al. |
| 4,623,837 | A |   | 11/1986 | Efron et al. |
| 4,677,455 | A |   | 6/1987  | Okajima ......................... 357/38 |
| 4,677,466 | A | * | 6/1987  | Lert et al. ........................ 725/22 |
| 4,739,398 | A |   | 4/1988  | Thomas et al. ............... 358/84 |

(Continued)

FOREIGN PATENT DOCUMENTS

| EP | 0349106 A1 | 1/1990 |
| EP | 0402210 A1 | 6/1990 |

(Continued)

OTHER PUBLICATIONS

L. Baum et al., A Maximization Technique Occurring in the Statistical Analysis of Probabilistic Functions of Markov Chains, *The Annals of Mathematical Statistics*,, vol. 41, No. 1 pp. 164-171, 1970 (no month).

(Continued)

*Primary Examiner* — Dhairya A Patel
(74) *Attorney, Agent, or Firm* — Lowenstein Sandler LLP (57) ABSTRACT

A method and system for playlist generation is disclosed. In one aspect, the system may include at least one analysis module for receiving and analyzing an unknown work and generating a corresponding representation thereof, and at least one identification (ID) server for receiving the representation from the analysis modules and determining the identity of the unknown work.

47 Claims, 5 Drawing Sheets

(56) References Cited

U.S. PATENT DOCUMENTS

| | | | |
|---|---|---|---|
| 4,843,562 A | 6/1989 | Kenyon et al. .................. 364/487 |
| 4,918,730 A | 4/1990 | Schulze |
| 5,210,820 A | 5/1993 | Kenyon ............................ 395/2 |
| 5,247,688 A | 9/1993 | Ishigami |
| 5,283,819 A | 2/1994 | Glick et al. ..................... 379/90 |
| 5,327,521 A | 7/1994 | Savic et al. |
| 5,437,050 A | 7/1995 | Lamb et al. ....................... 455/2 |
| 5,442,645 A | 8/1995 | Ugon |
| 5,504,518 A | 4/1996 | Ellis |
| 5,581,658 A | 12/1996 | O'Hagan et al. ................. 395/22 |
| 5,588,119 A | 12/1996 | Vincent |
| 5,612,729 A | 3/1997 | Ellis et al. |
| 5,612,974 A | 3/1997 | Astrachan |
| 5,613,004 A | 3/1997 | Cooperman et al. |
| 5,638,443 A | 6/1997 | Stefik |
| 5,692,213 A | 11/1997 | Goldberg et al. |
| 5,701,452 A | 12/1997 | Siefert |
| 5,710,916 A | 1/1998 | Barbara et al. |
| 5,724,605 A | 3/1998 | Wissner |
| 5,732,193 A * | 3/1998 | Aberson .......................... 706/45 |
| 5,850,388 A | 12/1998 | Anderson |
| 5,862,260 A | 1/1999 | Rhoads |
| 5,881,182 A | 3/1999 | Fiete et al. |
| 5,918,223 A * | 6/1999 | Blum et al. ........................ 707/1 |
| 5,924,071 A | 7/1999 | Morgan et al. |
| 5,930,369 A | 7/1999 | Cox et al. |
| 5,943,422 A | 8/1999 | Van Wie et al. |
| 5,949,885 A | 9/1999 | Leighton |
| 5,959,659 A | 9/1999 | Dokic |
| 5,983,176 A | 11/1999 | Hoffert et al. |
| 6,006,183 A * | 12/1999 | Lai et al. ......................... 704/235 |
| 6,006,256 A | 12/1999 | Zdepski et al. ................. 709/217 |
| 6,011,758 A | 1/2000 | Dockes et al. .................... 369/30 |
| 6,012,051 A | 1/2000 | Sammons |
| 6,026,411 A | 2/2000 | Delp |
| 6,026,439 A * | 2/2000 | Chowdhury et al. .......... 709/223 |
| 6,044,402 A | 3/2000 | Jacobson et al. ............... 709/225 |
| 6,067,369 A | 5/2000 | Kamei |
| 6,088,455 A | 7/2000 | Logan et al. |
| 6,092,040 A | 7/2000 | Voran |
| 6,096,961 A | 8/2000 | Bruti |
| 6,118,450 A | 9/2000 | Proehl et al. .................... 345/349 |
| 6,192,340 B1 * | 2/2001 | Abecassis ....................... 704/270 |
| 6,195,693 B1 | 2/2001 | Berry |
| 6,229,922 B1 | 5/2001 | Sasakawa et al. |
| 6,243,615 B1 | 6/2001 | Neway |
| 6,243,725 B1 | 6/2001 | Hempleman et al. |
| 6,253,193 B1 | 6/2001 | Ginter et al. ..................... 705/57 |
| 6,253,337 B1 | 6/2001 | Maloney et al. ................. 714/38 |
| 6,279,010 B1 | 8/2001 | Anderson ....................... 707/202 |
| 6,279,124 B1 * | 8/2001 | Brouwer et al. ............. 714/38.11 |
| 6,285,596 B1 | 9/2001 | Miura et al. |
| 6,330,593 B1 | 12/2001 | Roberts et al. |
| 6,345,256 B1 | 2/2002 | Milsted et al. |
| 6,345,274 B1 | 2/2002 | Zhu |
| 6,360,265 B1 | 3/2002 | Falck et al. |
| 6,363,381 B1 | 3/2002 | Lee et al. |
| 6,370,513 B1 | 4/2002 | Kolawa |
| 6,374,260 B1 | 4/2002 | Hoffert et al. ................. 707/104.1 |
| 6,385,596 B1 | 5/2002 | Wiser |
| 6,418,421 B1 | 7/2002 | Hurtado et al. |
| 6,425,081 B1 | 7/2002 | Iwamura |
| 6,434,520 B1 | 8/2002 | Kanevsky et al. |
| 6,438,556 B1 | 8/2002 | Malik et al. |
| 6,449,226 B1 | 9/2002 | Kumagai |
| 6,452,874 B1 | 9/2002 | Otsuka et al. |
| 6,453,252 B1 | 9/2002 | Laroche .......................... 702/75 |
| 6,460,050 B1 | 10/2002 | Pace et al. |
| 6,463,508 B1 | 10/2002 | Wolf et al. |
| 6,477,704 B1 | 11/2002 | Cremia |
| 6,487,641 B1 | 11/2002 | Cusson et al. |
| 6,490,279 B1 | 12/2002 | Chen et al. |
| 6,496,802 B1 | 12/2002 | van Zoest et al. |
| 6,526,411 B1 | 2/2003 | Ward |
| 6,542,869 B1 | 4/2003 | Foote |
| 6,550,001 B1 | 4/2003 | Corwin et al. |
| 6,550,011 B1 | 4/2003 | Sims, III |
| 6,552,254 B2 | 4/2003 | Hasegawa et al. |
| 6,591,245 B1 | 7/2003 | Klug |
| 6,609,093 B1 | 8/2003 | Gopinath et al. |
| 6,609,105 B2 | 8/2003 | van Zoest et al. |
| 6,628,737 B1 | 9/2003 | Timus |
| 6,636,965 B1 | 10/2003 | Beyda et al. |
| 6,654,757 B1 | 11/2003 | Stern |
| 6,675,174 B1 | 1/2004 | Bolle et al. |
| 6,714,921 B2 | 3/2004 | Stefik et al. |
| 6,732,180 B1 | 5/2004 | Hale |
| 6,771,316 B1 | 8/2004 | Iggulden |
| 6,771,885 B1 | 8/2004 | Agnihotri et al. |
| 6,788,800 B1 | 9/2004 | Carr et al. |
| 6,834,308 B1 | 12/2004 | Ikezoye |
| 6,947,909 B1 | 9/2005 | Hoke, Jr. |
| 6,968,337 B2 | 11/2005 | Wold |
| 6,990,453 B2 | 1/2006 | Wang et al. |
| 7,043,536 B1 | 5/2006 | Philyaw |
| 7,047,241 B1 | 5/2006 | Erickson et al. |
| 7,058,223 B2 | 6/2006 | Cox et al. |
| 7,181,398 B2 | 2/2007 | Thong et al. |
| 7,266,645 B2 | 9/2007 | Garg et al. |
| 7,269,556 B2 | 9/2007 | Kiss et al. |
| 7,281,272 B1 | 10/2007 | Rubin et al. |
| 7,289,643 B2 | 10/2007 | Brunk et al. |
| 7,349,552 B2 | 3/2008 | Levy et al. |
| 7,363,278 B2 | 4/2008 | Schmelzer et al. |
| 7,426,750 B2 | 9/2008 | Cooper et al. |
| 7,443,797 B2 | 10/2008 | Cheung et al. |
| 7,474,759 B2 | 1/2009 | Sternberg et al. |
| 7,500,007 B2 | 3/2009 | Ikezoye et al. |
| 7,529,659 B2 | 5/2009 | Wold |
| 7,546,120 B1 | 6/2009 | Ulvenes et al. |
| 7,562,012 B1 | 7/2009 | Wold |
| 7,565,327 B2 | 7/2009 | Schmelzer |
| 7,593,576 B2 | 9/2009 | Meyer et al. |
| 7,653,210 B2 | 1/2010 | Rhoads |
| 7,701,941 B2 | 4/2010 | O'Callaghan et al. |
| 7,707,088 B2 | 4/2010 | Schmelzer et al. |
| 7,711,652 B2 | 5/2010 | Schmelzer et al. |
| 7,770,013 B2 | 8/2010 | Rhoads et al. |
| 7,797,249 B2 | 9/2010 | Schmelzer et al. |
| 7,877,438 B2 | 1/2011 | Schrempp et al. |
| 7,917,645 B2 | 3/2011 | Ikezoye et al. |
| 8,006,314 B2 | 8/2011 | Wold |
| 8,082,150 B2 | 12/2011 | Wold |
| 8,086,445 B2 | 12/2011 | Wold |
| 8,112,818 B2 | 2/2012 | Wold |
| 8,130,746 B2 | 3/2012 | Schrempp et al. |
| 8,199,651 B1 | 6/2012 | Schrempp et al. |
| 8,316,238 B2 | 11/2012 | Mergen et al. |
| 8,332,326 B2 | 12/2012 | Schrempp et al. |
| 8,484,691 B2 | 7/2013 | Schmelzer et al. |
| 2001/0013061 A1 | 8/2001 | DeMartin et al. ............. 709/217 |
| 2001/0027493 A1 | 10/2001 | Wallace |
| 2001/0027522 A1 | 10/2001 | Saito |
| 2001/0034219 A1 | 10/2001 | Hewitt et al. |
| 2001/0037304 A1 | 11/2001 | Paiz ................................ 705/52 |
| 2001/0041989 A1 | 11/2001 | Vilcauskas et al. |
| 2001/0051996 A1 | 12/2001 | Cooper et al. |
| 2001/0056430 A1 | 12/2001 | Yankowki |
| 2002/0019858 A1 * | 2/2002 | Kaiser et al. .................. 709/219 |
| 2002/0023220 A1 | 2/2002 | Kaplan |
| 2002/0049760 A1 | 4/2002 | Scott |
| 2002/0064149 A1 | 5/2002 | Elliott et al. |
| 2002/0069098 A1 | 6/2002 | Schmidt |
| 2002/0073316 A1 | 6/2002 | Collins |
| 2002/0082999 A1 | 6/2002 | Lee |
| 2002/0083060 A1 | 6/2002 | Wang et al. |
| 2002/0087885 A1 | 7/2002 | Peled et al. ..................... 713/201 |
| 2002/0120577 A1 | 8/2002 | Hans et al. |
| 2002/0123990 A1 | 9/2002 | Abe et al. |
| 2002/0129140 A1 | 9/2002 | Peled et al. |
| 2002/0133494 A1 | 9/2002 | Goedken |
| 2002/0133499 A1 | 9/2002 | Ward et al. |
| 2002/0141384 A1 | 10/2002 | Liu et al. |
| 2002/0152261 A1 | 10/2002 | Arkin et al. |

(56) References Cited

U.S. PATENT DOCUMENTS

| | | |
|---|---|---|
| 2002/0152262 A1 | 10/2002 | Arkin et al. |
| 2002/0156737 A1 | 10/2002 | Kahn |
| 2002/0157005 A1 | 10/2002 | Brunk et al. |
| 2002/0158737 A1 | 10/2002 | Yokoyama |
| 2002/0186887 A1 | 12/2002 | Rhoads |
| 2002/0198789 A1 | 12/2002 | Waldman |
| 2003/0014530 A1 | 1/2003 | Bodin et al. ............... 709/231 |
| 2003/0018709 A1 | 1/2003 | Schrempp et al. |
| 2003/0023852 A1 | 1/2003 | Wold |
| 2003/0033321 A1 | 2/2003 | Schrempp et al. |
| 2003/0037010 A1 | 2/2003 | Schmelzer |
| 2003/0051100 A1 | 3/2003 | Patel |
| 2003/0061352 A1 | 3/2003 | Bohrer et al. .............. 709/226 |
| 2003/0061490 A1 | 3/2003 | Abajian |
| 2003/0095660 A1 | 5/2003 | Lee et al. |
| 2003/0105739 A1 | 6/2003 | Essafi et al. |
| 2003/0135623 A1 | 7/2003 | Schrempp et al. |
| 2003/0191719 A1 | 10/2003 | Ginter et al. |
| 2003/0191764 A1 | 10/2003 | Richards |
| 2003/0195852 A1 | 10/2003 | Campbell et al. |
| 2004/0008864 A1 | 1/2004 | Watson et al. |
| 2004/0010495 A1 | 1/2004 | Kramer et al. |
| 2004/0028281 A1 | 2/2004 | Cheng et al. |
| 2004/0053654 A1 | 3/2004 | Kokumai et al. |
| 2004/0073513 A1 | 4/2004 | Stefik et al. |
| 2004/0089142 A1 | 5/2004 | Georges et al. |
| 2004/0133797 A1 | 7/2004 | Arnold |
| 2004/0148191 A1 | 7/2004 | Hoke, Jr. |
| 2004/0163106 A1 | 8/2004 | Schrempp et al. |
| 2004/0167858 A1 | 8/2004 | Erickson |
| 2004/0201784 A9 | 10/2004 | Dagtas et al. |
| 2005/0021783 A1 | 1/2005 | Ishii |
| 2005/0038819 A1 | 2/2005 | Hicken et al. |
| 2005/0039000 A1 | 2/2005 | Erickson |
| 2005/0044189 A1 | 2/2005 | Ikezoye et al. |
| 2005/0097075 A1 | 5/2005 | Shuster |
| 2005/0154678 A1 | 7/2005 | Schmelzer |
| 2005/0154680 A1 | 7/2005 | Schmelzer |
| 2005/0154681 A1 | 7/2005 | Schmelzer |
| 2005/0216433 A1 | 9/2005 | Bland et al. |
| 2005/0267945 A1 | 12/2005 | Cohen et al. |
| 2005/0289065 A1 | 12/2005 | Weare |
| 2006/0034177 A1 | 2/2006 | Schrempp |
| 2006/0062426 A1 | 3/2006 | Levy et al. |
| 2007/0033409 A1 | 2/2007 | Brunk et al. |
| 2007/0074147 A1 | 3/2007 | Wold |
| 2007/0078769 A1 | 4/2007 | Way |
| 2007/0186229 A1 | 8/2007 | Conklin et al. |
| 2007/0226365 A1 | 9/2007 | Hildreth et al. |
| 2008/0008173 A1 | 1/2008 | Kanevsky et al. |
| 2008/0019371 A1 | 1/2008 | Anschutz et al. |
| 2008/0133415 A1 | 6/2008 | Ginter et al. |
| 2008/0141379 A1 | 6/2008 | Schmelzer |
| 2008/0154730 A1 | 6/2008 | Schmelzer |
| 2008/0155116 A1 | 6/2008 | Schmelzer |
| 2009/0030651 A1 | 1/2009 | Wold |
| 2009/0031326 A1 | 1/2009 | Wold |
| 2009/0043870 A1 | 2/2009 | Ikezoye et al. |
| 2009/0077673 A1 | 3/2009 | Schmelzer |
| 2009/0089586 A1 | 4/2009 | Brunk |
| 2009/0131152 A1 | 5/2009 | Busse |
| 2009/0192640 A1 | 7/2009 | Wold |
| 2009/0240361 A1 | 9/2009 | Wold et al. |
| 2009/0328236 A1 | 12/2009 | Schmelzer |
| 2010/0042843 A1 | 2/2010 | Brunk |
| 2011/0119149 A1 | 5/2011 | Ikezoye et al. |
| 2012/0124679 A1 | 5/2012 | Wold |
| 2013/0011008 A1 | 1/2013 | Ikezoye et al. |

FOREIGN PATENT DOCUMENTS

| | | |
|---|---|---|
| EP | 0517405 A2 | 5/1992 |
| EP | 0689316 A2 | 12/1995 |
| EP | 0 731 446 A1 | 9/1996 |
| EP | 0859503 | 8/1998 |
| EP | 0459046 | 4/1999 |
| EP | 1354276 B1 | 12/2007 |
| EP | 1485815 B1 | 10/2009 |
| EP | 177191 B1 | 2/2012 |
| EP | 1449103 B1 | 3/2012 |
| GB | 2464049 | 12/2012 |
| WO | WO 96/36163 A3 | 11/1996 |
| WO | WO 98/20672 A3 | 5/1998 |
| WO | WO 00/05650 A1 | 2/2000 |
| WO | WO 00/39954 A1 | 7/2000 |
| WO | WO 00/63800 A1 | 10/2000 |
| WO | WO 01/23981 A1 | 4/2001 |
| WO | WO 01/47179 A1 | 6/2001 |
| WO | WO 01/52540 A1 | 7/2001 |
| WO | WO 01/62004 | 8/2001 |
| WO | WO 02/03203 | 1/2002 |
| WO | WO 02/15035 | 2/2002 |
| WO | WO 02/37316 | 5/2002 |
| WO | WO 02/082271 | 10/2002 |
| WO | 03/009149 A1 | 1/2003 |
| WO | WO 03/007235 A1 | 1/2003 |
| WO | WO 03/036496 A1 | 5/2003 |
| WO | WO 03/067459 A1 | 8/2003 |
| WO | WO 03/091990 A1 | 11/2003 |
| WO | WO 2004/044820 A1 | 5/2004 |
| WO | WO 2004/070558 | 8/2004 |
| WO | WO 2006/015168 A2 | 2/2006 |
| WO | WO 2009/017710 | 2/2009 |

OTHER PUBLICATIONS

A. P. Dempster et al. "Maximum Likelihood from Incomplete Data via the $EM$ Algorithm", *Journal of the Royal Statistical Society, Series B (Methodological)*, vol. 39, Issue 1, pp. 1-38, 1977 (no month).

D. Reynolds et al., "Robust Text-Independent Speaker Identification Using Gaussian Mixture Speaker Models", *IEEE Transactions on Speech and Audio Processing*, vol. 3, No. 1, pp. 72-83, Jan. 1995.

B. Pellom et al., "Fast Likelihood Computation Techniques in Nearest-Neighbor Based search for Continuous Speech Recognition", *IEEE Signal Processing Letters*, vol. 8. No. * pp. 221-224, Aug. 2001.

J. Haitsma et al., "Robust Audio hashing for Content Identification", *CBMI 2001, Second International Workshop on Content Based Multimedia and Indexing*, Sep. 19-21, 2001, Brescia, Italy., Sep. 19-21, 2001.

European Supplementary Search Report for Corresponding PCT/US0233186, Feb. 7, 2007, pp. 1-4.

Gasaway Laura, Close of Century Sees New Copyright Amendments, March 200, Information Outlook, 4, 3, 42.

Gonzalez, R. and Melih, K., "Content Based Retrieval of Audio," The Institute for Telecommunication Research, University of Wollongong, Australia. ATNAC '96 Proceedings.

Harris, Lesley Ellen, "To register or not," Mar. 2006, Information Outlook, 10, 3, 32(s).

Kanth, K.V. et al. "Dimensionality Reduction or Similarity Searching in Databases," Computer Vision and Image understanding, vol. 75, Nos. 1/2 Jul./Aug. 1999, pp. 59-72, Academic Press. Santa Barbara, CA, USA.

Keislar, D., Blum, T., Wheaton, J., and Wold, E., "Audio Analysis for Content-Based Retrieval" Proceedings of the 1995 International Computer Music Conference.

Ohtsuki, K., et al., "Topic extraction based on continuous speech recognition in broadcast-news speech," Proceedings IEEE Workshop on Automated Speech Recognition and Understanding, 1997, pp. 527-534, N.Y., N.Y., USA.

Packethound Tech Specs, www.palisdesys.com/products/packethount/tck specs/prodPhtechspecs.shtml, 2002.

"How does PacketHound work?", www.palisdesys.com/products/packethound/how_does_it_work/prod_Pghhow.shtml 2002.

Pankanti, Sharath, "Verification Watermarks on Fingerprint Recognition and Retrieval," Part of IS&T/SPIE Conference on Security and Watermarking of Multimedia Contents, San Jose, CA Jan. 1999, SPIE vol. 3657, pp. 66-78.

(56) References Cited

OTHER PUBLICATIONS

Pellom, B. et al., "Fast Likelihood Computation Techniques in Nearest-Neighbor search for Continuous Speech Recognition.", *IEEE Signal Processing Letters*, vol. 8, pp. 221-224 Aug. 2001.

Scheirer, E., Slaney, M., "Construction and Evaluation of a Robust Multifeature Speech/Music Discriminator," pp. 1-4, Proceedings of ICASSP-97, Apr. 2-24, Munich, Germany.

Scheirer, E.D., "Tempo and Beat Analysis of Acoustic Musical Signals," Machine Listening Group, E15-401D MIT Media Laboratory, pp. 1-21, Aug. 8, 1997, Cambridge, MA.

Schneier, Bruce, Applied Cryptography, Protocols, Algorithms and Source Code in C, Chapter 2 Protocol Building Blocks, 1996, pp. 30-31.

Smith, Alan J., "Cache Memories," Computer Surveys, Sep. 1982, University of California, Berkeley, California, vol. 14, No. 3, pp. 1-61.

Vertegaal, R. and Bonis, E., "ISEE: An Intuitive Sound Editing Environment," Computer Music Journal, 18:2, pp. 21-22, Summer 1994.

Wang, Yao, et al., "Multimedia Content Analysis," IEEE Signal Processing Magazine, pp. 12-36, Nov. 2000, IEEE Service Center, Piscataway, N.J., USA.

Wold, Erling, et al., "Content Based Classification, Search and Retrieval of Audio," IEEE Multimedia, vol. 3, No. 3, pp. 27-36, 1996 IEEE Service Center, Piscataway, N.J., USA.

Zawodny, Jeremy, D., "A C Program to Compute CDDB discids on Linus and FreeBSD," [internet] http://jeremy.zawodny.com/c/discid-linux-1.3tar.gz, 1 page, Apr. 14, 2001, retrieved Jul. 17, 2007.

European Patent Application No. 02752347.1, Supplementary European Search Report Dated May 8, 2006, 4 pages.

European Patent Application No. 02756525.8, Supplementary European Search Report Dated Jun. 28, 2006, 4 pages.

European Patent Application No. 02782170, Supplementary European Search Report Dated Feb. 7, 2007, 4 pages.

European Patent Application No. 02725522.3, Supplementary European Search Report Dated May 12, 2006, 2 Pages.

European Patent Application No. 04706547.9 European Search Report Dated Feb. 25, 2010, 3 Pages.

European Patent Application No. 05778109.8 European Search Report Dated Sep. 10, 2010, 7 Pages.

PCT Search Report PCT/US01/50295, International Search Report dated May 14, 2003, 5 Pages.

PCT Search Report PCT/US02/10615, International Search Report dated Aug. 7, 2002, 5 Pages.

PCT Search Report PCT/US04/02748, International Search Report and Written Opinion dated Aug. 20, 2007, 8 Pages.

PCT Search Report PCT/US05/26887, International Search Report dated May 3, 2006, 3 Pages.

PCT Search Report PCT/US08/09127, International Search Report dated Oct. 30, 2008, 8 Pages.

USPTO Office Action for U.S. Appl. No. 09/511,632 mailed Dec. 4, 2002.

USPTO Office Action for U.S. Appl. No. 09/511,632 mailed May 13, 2003.

USPTO Office Action for U.S. Appl. No. 09/511,632 mailed Aug. 27, 2003.

USPTO Office Action for U.S. Appl. No. 09/910,680 mailed Nov. 17, 2004.

USPTO Office Action for U.S. Appl. No. 09/999,763 mailed Apr. 6, 2005.

USPTO Office Action for U.S. Appl. No. 09/999,763 mailed Oct. 6, 2005.

USPTO Office Action for U.S. Appl. No. 09/511,632 mailed Feb. 5, 2004.

USPTO Notice of Allowance for U.S. Appl. No. 09/511,632 mailed Aug. 10, 2004.

USPTO Notice of Allowance for U.S. Appl. No. 10/955,841 mailed Sep. 25, 2006.

USPTO Notice of Allowance for U.S. Appl. No. 10/955,841 mailed Mar. 23, 2007.

USPTO Notice of Allowance for U.S. Appl. No. 10/955,841 mailed Sep. 11, 2007.

USPTO Notice of Allowance for U.S. Appl. No. 10/955,841 mailed Feb. 25, 2008.

USPTO Notice of Allowance for U.S. Appl. No. 12/251,404 mailed May 14, 2010.

USPTO Office Action for U.S. Appl. No. 13/011,776 mailed Feb. 26, 2013.

USPTO Office Action for U.S. Appl. No. 13/011,776 mailed Jul. 10, 2013.

USPTO Office Action for U.S. Appl. No. 13/011,776 mailed Feb. 5, 2013.

USPTO Office Action for U.S. Appl. No. 13/011,776 mailed Jul. 19, 2013.

USPTO Office Action for U.S. Appl. No. 09/999,763 mailed Apr. 7, 2006.

USPTO Office Action for U.S. Appl. No. 09/999,763 mailed Oct. 6, 2006.

USPTO Office Action for U.S. Appl. No. 09/999,763 mailed Mar. 7, 2007.

USPTO Office Action for U.S. Appl. No. 09/999,763 mailed Aug. 20, 2007.

USPTO Office Action for U.S. Appl. No. 09/999,763 mailed Jan. 7, 2008.

USPTO Office Action for U.S. Appl. No. 09/999,763 mailed Jun. 27, 2008.

USPTO Office Action for U.S. Appl. No. 09/999,763 mailed Dec. 22, 2008.

USPTO Office Action for U.S. Appl. No. 09/999,763 mailed Jul. 20, 2009.

USPTO Office Action for U.S. Appl. No. 09/999,763 mailed Dec. 21, 2009.

USPTO Office Action for U.S. Appl. No. 09/999,763 mailed Jun. 23, 2010.

USPTO Notice of Allowance for U.S. Appl. No. 09/999,763 mailed Sep. 16, 2010.

USPTO Office Action for U.S. Appl. No. 10/072,238 mailed May 3, 2005.

USPTO Office Action for U.S. Appl. No. 10/072,238 mailed Oct. 25, 2005.

USPTO Office Action for U.S. Appl. No. 10/072,238 mailed Apr. 25, 2006.

USPTO Office Action for U.S. Appl. No. 10/072,238 mailed Sep. 19, 2007.

USPTO Office Action for U.S. Appl. No. 10/072,238 mailed Apr. 7, 2008.

USPTO Office Action for U.S. Appl. No. 10/072,238 mailed Oct. 1, 2008.

USPTO Office Action for U.S. Appl. No. 08/897,662 mailed Aug. 13, 1998.

USPTO Notice of Allowance for U.S. Appl. No. 08/897,662 mailed Jan. 29, 1999.

USPTO Office Action for U.S. Appl. No. 09/706,227 mailed May 5, 2004.

USPTO Office Action for U.S. Appl. No. 09/706,227 mailed Nov. 12, 2004.

USPTO Office Action for U.S. Appl. No. 09/706,227 mailed May 9, 2005.

USPTO Office Action for U.S. Appl. No. 09/706,227 mailed Nov. 1, 2005.

USPTO Office Action for U.S. Appl. No. 09/706,227 mailed Jun. 23, 2006.

USPTO Office Action for U.S. Appl. No. 09/706,227 mailed Nov. 7, 2006.

USPTO Office Action for U.S. Appl. No. 09/706,227 mailed Mar. 29, 2007.

USPTO Office Action for U.S. Appl. No. 09/706,227 mailed Sep. 17, 2007.

USPTO Office Action for U.S. Appl. No. 09/706,227 mailed May 29, 2008.

USPTO Office Action for U.S. Appl. No. 09/706,227 mailed Jan. 9, 2009.

(56) References Cited

OTHER PUBLICATIONS

USPTO Office Action for U.S. Appl. No. 12/482,313 mailed Feb. 4, 2011.
USPTO Notice of Allowance for U.S. Appl. No. 12/482,313 mailed Aug. 23, 2011.
USPTO Office Action for U.S. Appl. No. 10/192,783 mailed Dec. 13, 2004.
USPTO Notice of Allowance for U.S. Appl. No. 10/192,783 mailed Jun. 7, 2005.
USPTO Office Action for U.S. Appl. No. 11/239,543 mailed Apr. 23, 2008.
USPTO Notice of Allowance for U.S. Appl. No. 11/239,543 mailed Nov. 6, 2008.
USPTO Notice of Allowance for U.S. Appl. No. 11/239,543 mailed Feb. 25, 2009.
USPTO Office Action for U.S. Appl. No. 12/410,445 mailed Aug. 10, 2010.
USPTO Notice of Allowance for U.S. Appl. No. 12/410,445 mailed Oct. 20, 2010.
USPTO Notice of Allowance for U.S. Appl. No. 12/410,445 mailed Aug. 12, 2011.
USPTO Office Action for U.S. Appl. No. 10/072,238 mailed Jan. 9, 2009.
USPTO Office Action for U.S. Appl. No. 10/072,238 mailed Mar. 31, 2009.
USPTO Office Action for U.S. Appl. No. 10/072,238 mailed Aug. 6, 2010.
USPTO Office Action for U.S. Appl. No. 11/116,710 mailed Dec. 13, 2004.
USPTO Office Action for U.S. Appl. No. 11/116,710 mailed Apr. 8, 2005.
USPTO Office Action for U.S. Appl. No. 11/116,710 mailed Oct. 7, 2005.
USPTO Office Action for U.S. Appl. No. 11/116,710 mailed Apr. 20, 2006.
USPTO Office Action for U.S. Appl. No. 11/116,710 mailed Jul. 31, 2006.
USPTO Office Action for U.S. Appl. No. 11/116,710 mailed Jan. 16, 2007.
USPTO Notice of Allowance for U.S. Appl. No. 11/116,710 mailed Nov. 19, 2007.
USPTO Office ACtion for U.S. Appl. No. 12/042,023 mailed Dec. 29, 2008.
USPTO Office Action for U.S. Appl. No. 12/042,023 mailed Apr. 25, 2009.
USPTO Notice of Allowance for U.S. Appl. No. 12/042,023 mailed Mar. 8, 2010.
USPTO Office Action for U.S. Appl. No. 11/048,307 mailed Aug. 22, 2007.
USPTO Office Action for U.S. Appl. No. 11/048,307 mailed May 16, 2008.
USPTO Notice of Allowance for U.S. Appl. No. 11/048,307 mailed May 29, 2009.
USPTO Office Action for U.S. Appl. No. 12/488,504 mailed Nov. 10, 2010.
USPTO Office Action for U.S. Appl. No. 12/488,504 mailed Apr. 26, 2013.
USPTO Office Action for U.S. Appl. No. 12/488,504 mailed May 23, 2013.
USPTO Office Action for U.S. Appl. No. 11/048,308 mailed Feb. 25, 2008.
USPTO Office Action for U.S. Appl. No. 11/048,308 mailed Mar. 5, 2009.
USPTO Notice of Allowance for U.S. Appl. No. 11/048,308 mailed Aug. 7, 2009.
USPTO Office Action for U.S. Appl. No. 11/048,338 mailed Apr. 18, 2007.
USPTO Office Action for U.S. Appl. No. 11/048,338 mailed Oct. 11, 2007.
USPTO Office Action for U.S. Appl. No. 11/048,338 mailed Jan. 14, 2008.
USPTO Office Action for U.S. Appl. No. 11/048,338 mailed Jul. 9, 2008.
USPTO Office Action for U.S. Appl. No. 11/048,338 mailed Jan. 7, 2009.
USPTO Office Action for U.S. Appl. No. 11/048,338 mailed Jul. 6, 2009.
USPTO Office Action for U.S. Appl. No. 11/048,338 mailed Dec. 28, 2009.
USPTO Office Action for U.S. Appl. No. 11/048,338 mailed Jun. 24, 2010.
USPTO Office Action for U.S. Appl. No. 12/035,599 mailed Nov. 17, 2008.
USPTO Office Action for U.S. Appl. No. 12/035,599 mailed May 29, 2009.
USPTO Office Action for U.S. Appl. No. 12/035,599 mailed Nov. 24, 2009.
USPTO Office Action for U.S. Appl. No. 12/035,599 mailed Jun. 9, 2010.
USPTO Office Action for U.S. Appl. No. 12/035,599 mailed Aug. 7, 2012.
USPTO Notice of Allowance for U.S. Appl. No. 12/035,599 mailed Mar. 11, 2013.
USPTO Office Action for U.S. Appl. No. 12/035,609 mailed Dec. 29, 2008.
USPTO Office Action for U.S. Appl. No. 12/035,609 mailed Jun. 24, 2009.
USPTO Notice of Allowance for U.S. Appl. No. 12/035,609 mailed Dec. 11, 2009.
USPTO Notice of Allowance for U.S. Appl. No. 12/277,291 mailed May 12, 2010.
USPTO Office Action for U.S. Appl. No. 10/356,318 mailed May 24, 2006.
USPTO Office Action for U.S. Appl. No. 10/356,318 mailed Nov. 2, 2006.
USPTO Office Action for U.S. Appl. No. 10/356,318 mailed Apr. 11, 2007.
USPTO Office Action for U.S. Appl. No. 10/356,318 mailed Nov. 1, 2007.
USPTO Office Action for U.S. Appl. No. 10/356,318 mailed May 9, 2008.
USPTO Office Action for U.S. Appl. No. 10/356,318 mailed Jan. 6, 2009.
USPTO Office Action for U.S. Appl. No. 10/356,318 mailed Jun. 15, 2009.
USPTO Office Action for U.S. Appl. No. 10/356,318 mailed Jan. 21, 2010.
USPTO Office Action for U.S. Appl. No. 10/356,318 mailed Jan. 7, 2011.
USPTO Office Action for U.S. Appl. No. 10/356,318 mailed Jun. 17, 2011.
USPTO Notice of Allowance for U.S. Appl. No. 10/356,318 mailed Oct. 16, 2012.
USPTO Office Action for U.S. Appl. No. 11/191,493 mailed Jul. 17, 2008.
USPTO Office Action for U.S. Appl. No. 11/191,493 mailed Jan. 9, 2009.
USPTO Office Action for U.S. Appl. No. 11/191,493 mailed Apr. 28, 2009.
USPTO Office Action for U.S. Appl. No. 11/191,493 mailed Nov. 19, 2009.
USPTO Office Action for U.S. Appl. No. 11/191,493 mailed May 25, 2010.
USPTO Office Action for U.S. Appl. No. 11/191,493 mailed Oct. 4, 2010.
USPTO Notice of Allowance for U.S. Appl. No. 11/191,493 mailed Feb. 17, 2011.
USPTO Office Action for U.S. Appl. No. 11/829,662 mailed Oct. 8, 2010.
USPTO Notice of Allowance for U.S. Appl. No. 11/829,662 mailed Apr. 11, 2011.

(56) References Cited

OTHER PUBLICATIONS

USPTO Office Action for U.S. Appl. No. 11/923,491 mailed Nov. 12, 2010.
USPTO Notice of Allowance for U.S. Appl. No. 11/923,491 mailed Sep. 29, 2011.
USPTO Office Action for U.S. Appl. No. 13/355,424 mailed Jan. 18, 2013.
USPTO Office Action for U.S. Appl. No. 13/355,424 mailed May 24, 2013.
USPTO Office Action for U.S. Appl. No. 12/405,174 mailed Mar. 2, 2011.
USPTO Office Action for U.S. Appl. No. 12/405,174 mailed Sep. 9, 2011.
USPTO Notice of Allowance for U.S. Appl. No. 12/405,174 mailed Jan. 4, 2012.
Audible Magic Corporation, "Audio Identification Technology Provides the Cornerstone for Online Distribution," 2000, http://www.audiblemagic.com/documents/Technology_Summary.pdf.
Beritelli, F., et al., "Multilayer Chaotic Encryption for Secure Communications in packet switching Networks," IEEE, vol. 2 Aug. 2000, pp. 1575-1582.
Blum, T., Keislar, D., Wheaton, J., and Wold, E., "Audio Databases with Content-Based Retrieval," Proceedings of the 1995 International Joint Conference on Artificial Intelligence (IJCAI) Workshop on Intelligent Multimedia Information Retrieval, 1995.
Breslin, Pat, et al., Relatable Website, "Emusic uses Relatable's open source audio recognition solution, TRM, to signature its music catabblog for MusicBrainz database," http://www.relatable.com/news/pressrelease/001017.release.html, Oct. 17, 2000.
Business Wire, "Cisco and Fox Host Groundbreaking Screening of Titan A.E.; Animated Epic Will Be First Film Ever to be Digitaly Transmitted Over the Internet Monday," Jun. 5, 2000, 08:14 EDT.
Business Wire, "IBM: IBM Announces New Descrambler Software; First to Offer Software to Work With Digital Video Chips," Jun. 5, 25, 1997, 07:49.
Chen, et al., Yong-Cong, A Secure and Robust Digital Watermaking Technique by the Blcok Cipher RC6 and Secure Hash Algorithm, Deparment of Computer Science, National Tsing Hua University, 2001.
Cosi, P., De Poli, G., Prandoni, P., "Timbre Characterization with Mel-Cepstrum and Neural Nets," Proceedings of the 1994 International Computer Music Conference, pp. 42-45, San Francisco, No date.
Feiten, B. and Gunzel, S., "Automatic Indexing of a Sound Database Using Self-Organizing Neural Nets," Computer Music Journal, 18:3, pp. 53-65, Fall 1994.
Fischer, S., Lienhart, R., and Effelsberg, W., "Automatic Recognition of Film Genres," Reihe Informatik, Jun. 1995, Universitat Mannheim, Praktische Informatik IV, L15, 16, D-68131 Mannheim.
Foote, J., "A Similarity Measure for Automatic Audio Classification," Institute of Systems Science, National University of Singapore, 1977, Singapore.
Lin, et al., "Generating Robust Digital Signature for Image/Video Authentication," Proc. Multimedia and Security workshop at ACM Multimedia'98, Sep. 1, 1998, pp. 49-54.
USPTO Office Action for U.S. Appl. No. 13/011,776 mailed Dec. 13, 2013.
USPTO Notice of Allowance for U.S. Appl. No. 12/488,504 mailed Sep. 13, 2013.

\* cited by examiner

PLAYLIST GENERATION METHOD AND APPARATUS

BACKGROUND

1. Field of the Disclosure

The present disclosure relates to data communications, and, in particular, to a novel system and apparatus for the automatic generation of media playlists.

2. The Prior Art

One application of the Internet that has received considerable attention is the ability to transmit or stream media content over the Internet. Once an audio or video work has been digitally encoded it may be both downloaded by users for play, or broadcast ("streamed") over the Internet. When works are streamed, they may be listened to or viewed by Internet users in a manner much like traditional radio and television stations.

Given the widespread use of digital media, audio works, or video works may need to be identified. The need for identification of works may arise in a variety of situations. For example, an artist may wish to verify royalty payments or generate their own Arbitron®-like ratings by identifying how often their works are being streamed or downloaded. Thus, playlists of media may need to be generated. The prior art has made efforts to create methods for identifying digital works and generating playlists.

As is known by those skilled in the art, a playlist is the documentation of the performance of one or more works at a particular time over a particular media.

Figure 1:
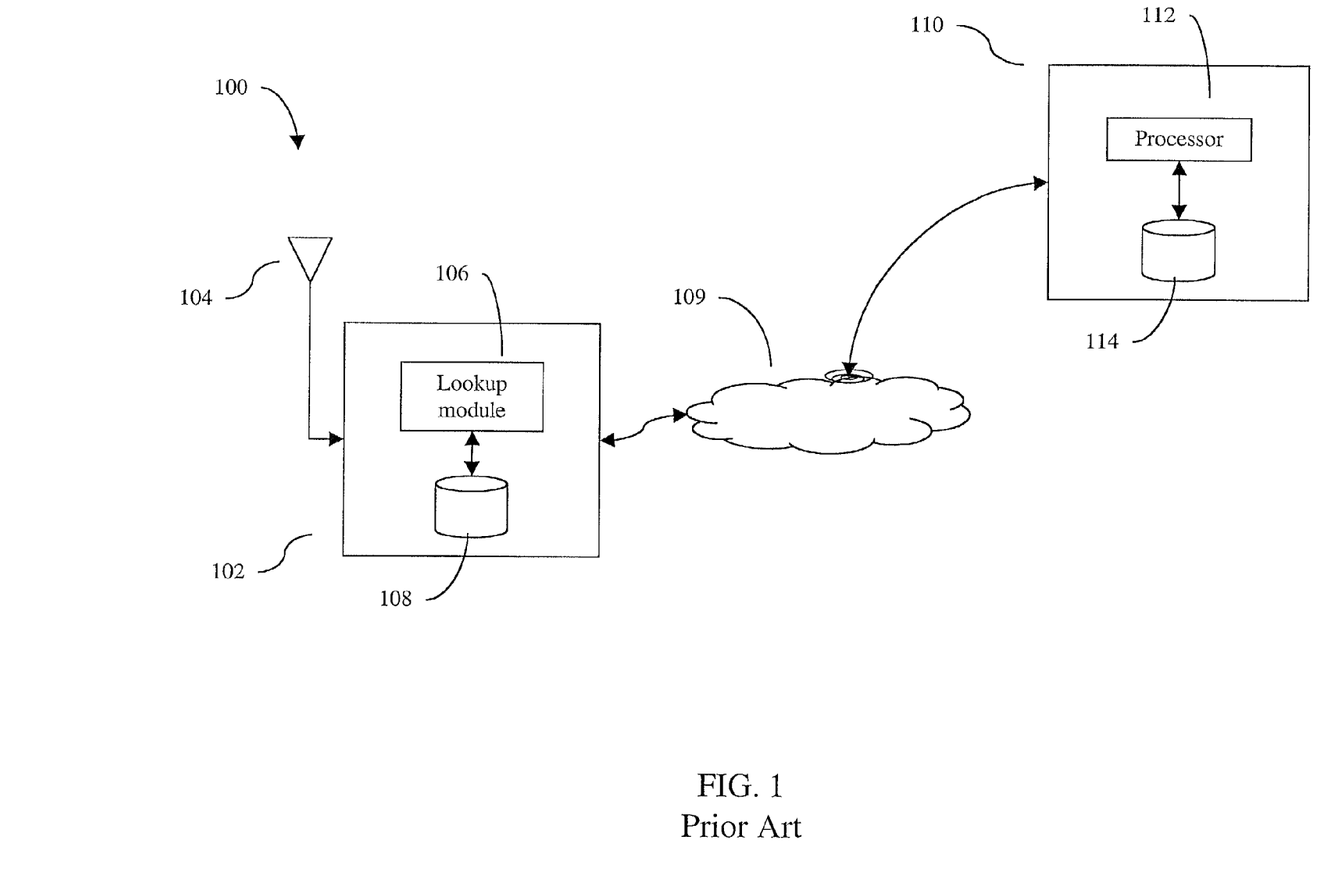
FIG. 1 is a prior art diagram of a system.

FIG. 1 shows a playlist generation system 100 of the prior art. The system 100 may include one or more remote detection modules 102 deployed at various locations throughout a broadcast area. Each detection module 102 may include an antenna 104 for receiving broadcast signals and providing the signals to an analysis and lookup module 106. The module 106 is typically configured to identify the content of the received signal by comparing its audio content against a database 108 of known reference signatures.

If a match is made, typically the module 102 will keep a record of all matches made during a predetermined period of time on the database 108. For example, the module 102 may keep a record of song titles detected during a 24-hour period.

The system 100 may further include a playlist server 110 having a processor 112 and database 114. The server 110 is typically configured to receive information such as the titles of identified songs from the one or more detection modules 102 through a network such as the Internet 109 and generate a playlist which may be stored on database 114.

The system 100 of the prior art in operation typically requires the identity of an unknown work to be determined by the individual detection modules. The playlist server 110 is typically only configured to receive and compile identities of works from the modules 102 into a playlist.

SUMMARY

A playlist generation system is disclosed. In one aspect, the system may include at least one analysis module for receiving and analyzing an unknown work and generating a corresponding representation thereof, and at least one identification (ID) server for receiving the representation from the at least one analysis modules and determining the identity of the unknown work.

The system may receive unknown works from networked sources or broadcast sources, or directly from the source prior to the work being provided to a network or broadcast source. The analysis modules and ID servers may be coupled over a network, such as the Internet.

The representations and identification may be based upon feature vectors, a spectral representation of the unknown work, the text output of a speech recognition system, musical score produced by a music transcription system, or a bit calculated key method, such as MD5 hash, as are known in the art.

The system analysis modules may receive a plurality of streaming sources for analysis at a single location, or from a plurality of streaming sources for analysis at a plurality of access points of the network.

The system provides representations in approximately real time, and the system may generate a playlist of identified works. The ID server may generate a playlist of identified works received from different access points of the network in approximately real time.

Various methods for generating a playlist are also disclosed.

DETAILED DESCRIPTION

Persons of ordinary skill in the art will realize that the following description is illustrative only and not in any way limiting. Other modifications and improvements will readily suggest themselves to such skilled persons having the benefit of this disclosure.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

Exemplary Structure

Figure 2:
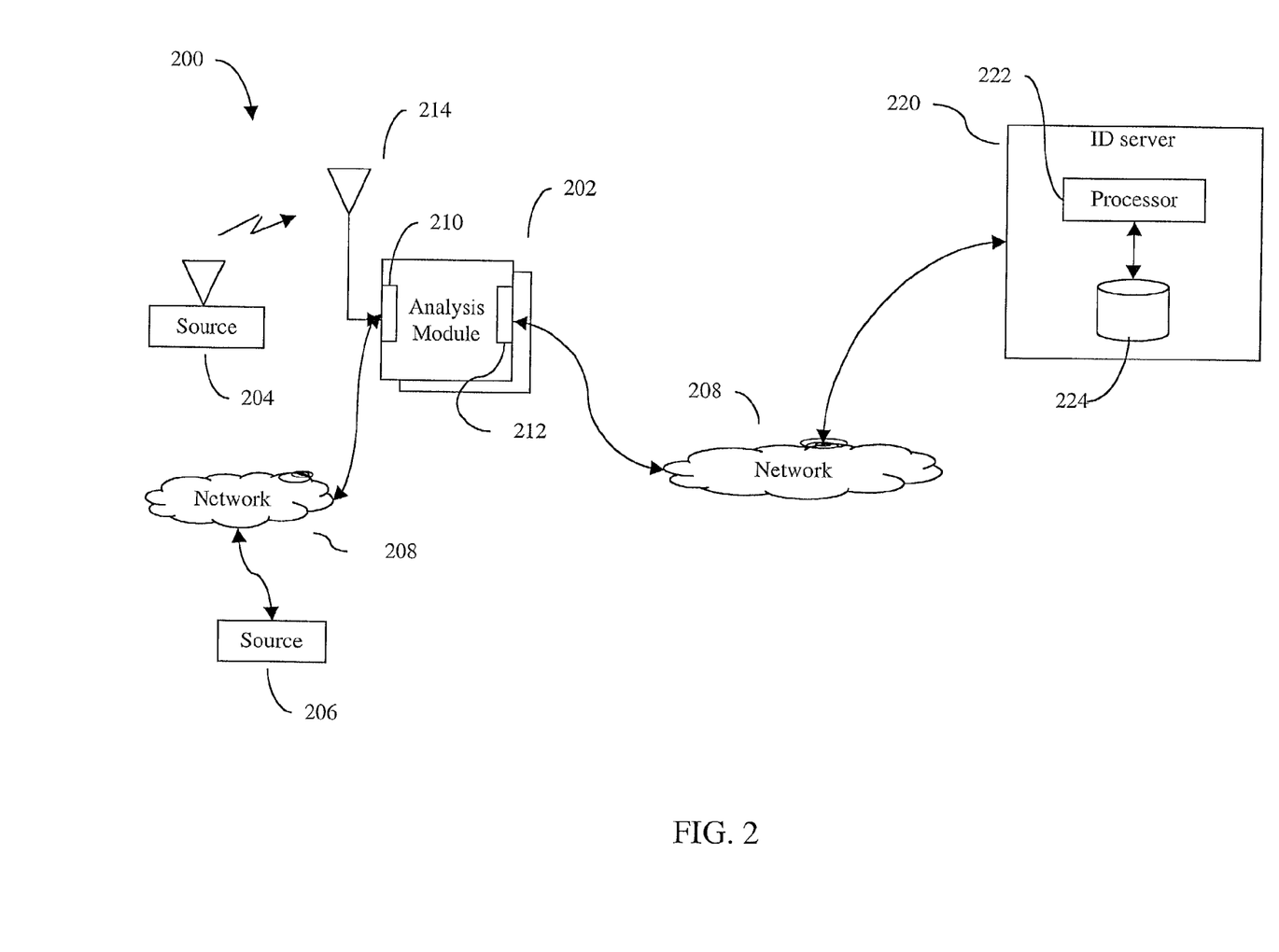
FIG. 2 is a block diagram of one aspect of a disclosed system including one or more analysis modules and ID servers.

FIG. 2 is a schematic diagram of one aspect of a disclosed playlist generation system 200. The system 200 may include at least one analysis module 202 for receiving an unknown work from a broadcast source 204 as is known in the art. The analysis module may include one or more conventional antennae 214 coupled to the analysis module 202 through an input port 210. The input port 210 may include a conventional receiver for the reception of desired broadcast signals. The input port 210 may also be configured to provide remote control functionality for allowing the remote control and configuration of the receiver, such as providing for remote tuning. The input port 210 may be further configured to digitize received signals in digital formats using protocols known in the art, such as PCM.

The analysis module 202 may also be configured to receive an unknown work from one or more networked sources 206. In one aspect of a disclosed system, the input port 210 of the analysis module 202 may be configured to monitor sources providing content in standard formats such as Real®, QuickTime®, Windows Media®, MP3®, and similar formats, using hardware and software as is known in the art.

In another aspect of a disclosed system, the input port 210 may be configured to directly receive audio or video through any of the various means know in the art, such as a microphone or video acquisition system. These unknown works may also be provided in standard formats such as MP3, Windows Media, and similar formats. Thus, the analysis module 202 may be configured to receive an unknown work prior to the unknown work being presented to the broadcast system or network source. It is envisioned that this presentation could occur almost simultaneously.

The input port 210 may be operatively coupled to a network 208 through which the source 206 may be accessed. The network 208 may comprise any packet- or frame-based network known in the art, such as the Internet. The input port 210 may also be configured to access the network 208 through any means known in the art, such as through traditional copper connections. Furthermore, the input port 210 may also be configured to access the network 208 using wireless connectivity methods as known in the art, including low-power broadband methods such as Bluetooth®, or cellular-based access methods such as those used to provide wireless connectivity to cellular phones and personal digital assistants (PDAs).

The analysis module 202 may also include an output port 212 for providing connectivity to the network 208. The output port 212 may comprise a separate unit within the analysis module 202 and may include hardware and software to provide the same functionality as the input port 210. Additionally, it is contemplated that the output port 212 may comprise substantially the same circuitry as the input port 210 in order to save space and cost.

Figure 3:
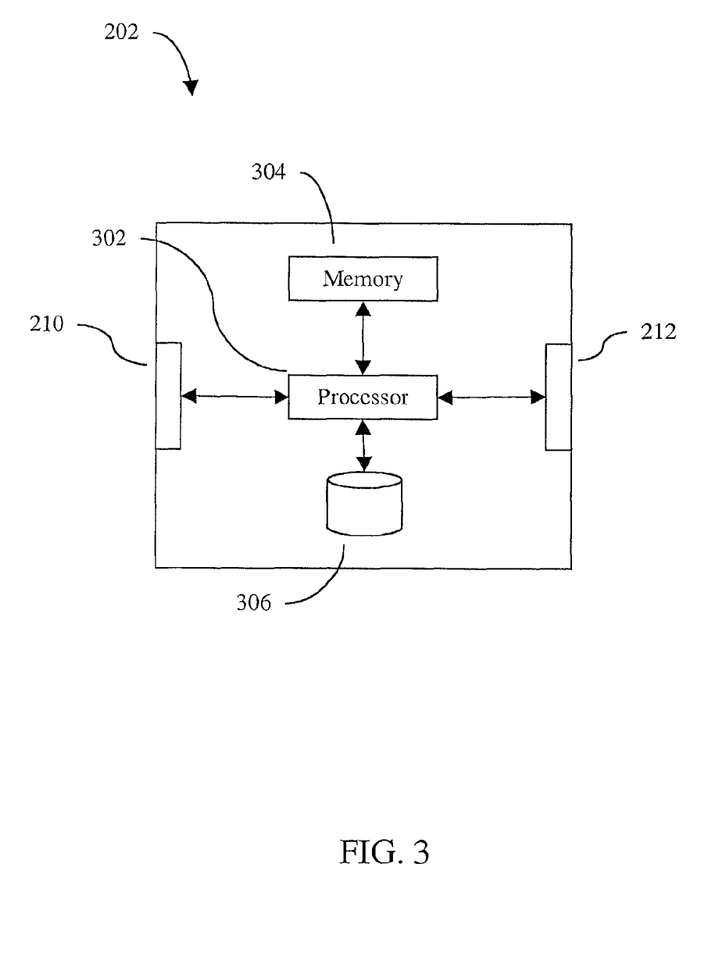
FIG. 3 is a block diagram of one aspect of an analysis module.

Referring now to FIG. 3, a conceptual block diagram of one aspect of a disclosed analysis module 202 is shown. The analysis module 202 may include a processor 302 for operating various aspects of the present disclosure. The processor 302 may be operatively disposed between the input port 210 and output port 212.

It is contemplated that any processor known in the art may be employed in the module 202, and the choice of a processor may depend on the application. For example, if the module 202 is embodied in a personal computer, the processor 202 may comprise a microprocessor capable of running conventional operating systems such as Microsoft Windows®, while if the module 202 is deployed in a mobile unit such as a PDA, the processor 202 may need only be capable of running an operating system such as Palm OS®, or other embedded systems such as may be present in a cell phone or other consumer device.

The module 202 may include ancillary hardware and software, such as conventional memory 304 and a conventional database 306 for the storage and retrieval of various aspects of the disclosed system and data.

The module 202 may be configured to generate a representation of an unknown work which may then be used by the system to identify the unknown work. It is contemplated that a wide variety of methods may be used by the analysis module 202 to generate the representation. The analysis module may be configured to generate a representation of the unknown work using the psychoacoustic properties of the audio content of the unknown work. Such methods are known in the art. For example, the analysis module may generate feature vectors as disclosed in U.S. Pat. No. 5,918,223 to Blum, et al., which is assigned to the same assignee of the present disclosure and incorporated by reference as though fully set forth herein.

Additionally, the module 202 may use audio or video spectral or wavelet representation techniques as are known in the art. For example, other representation forms may comprise the text output of a speech recognition system, text output of a close captioned transmission, or a musical score produced by a music transcription system. In another embodiment, the representation may comprise a bit calculated key using any of the techniques as are known in the art such as MD5 hash and CRC. It is contemplated that a wide variety of analysis methods may be employed singly or in combination advantageously in the present disclosure.

Referring back to FIG. 2, the system 200 may further include at least one identification (ID) server 220 for identifying an unknown work. The ID server 220 may identify an unknown work using a representation received from the analysis module 202 through network 208. Though FIG. 2 shows the ID server 220 coupled to the same network 208 as the analysis module 202, it is to be understood that the various components of the present disclosure may be coupled to different networks at different times.

The ID server 220 may comprise a computer suitable for running an operating system such as Microsoft Windows®, UNIX®, LINUX®, MAC OS®, and the like. The ID server 220 may include a conventional processor 222 for operation of the server. The ID server may further include associated hardware and software known in the art such as a conventional database 224 for storing embodiments of the disclosure or data.

It is contemplated that the ID server 220 may be configured to identify the unknown work using a variety of methods known in the art. The method for identification may correspond to the method(s) used to generate the representation within the analysis module. For example, the ID server 220 may be configured to perform identification using the methods disclosed in U.S. Pat. No. 5,918,223 to Blum, et al, if the representation were generated using corresponding methods.

Another example would be the pure spectral representations as are known in the art. It is envisioned that other representations such as wavelets may be used. The invention could also identify the unknown work from the speech recognized text compared against a database of song lyrics using any of a variety of methods known to those skilled in the art.

Yet another example would be any of a number of search techniques as are known in the art when the representation is a bit calculated key.

The system may also identify the unknown work by searching a collection of musical works for musical note sequences that correspond to the musical score in the representation.

In another configuration the system may use a combination of identification techniques, each of which correspond to a representation of the unknown work. By using several identification techniques, the chance of a mis-identification may be greatly reduced.

Though the analysis module and ID server are shown as being located separately, it is contemplated that they also may be co-located in a single server. For example, it is contemplated that the analysis module and ID server may each be embodied in a single board computer wherein the analysis module and ID server are housed in a single unit and operatively coupled through a common backplane.

Exemplary Operation

Figure 4:
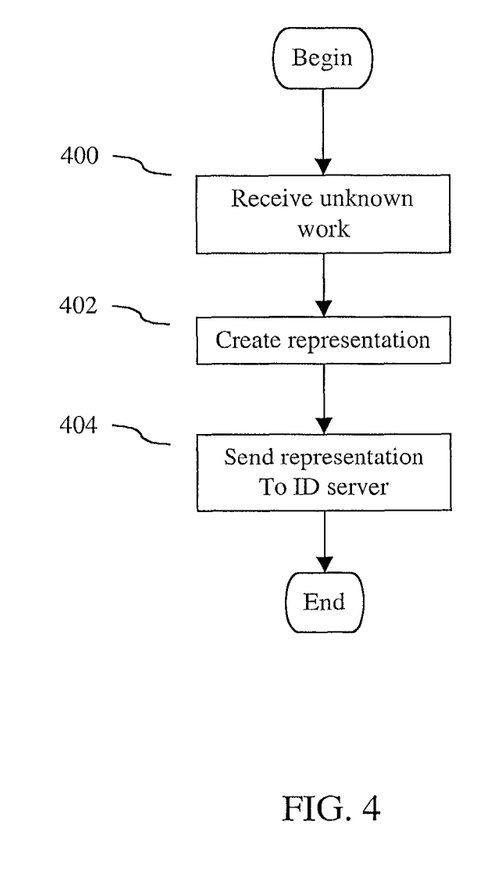
FIG. 4 is a flowchart of one aspect of a disclosed system.

FIG. 4 is a flowchart of one aspect of a disclosed method for automatically generating a playlist. The process begins in act 400, where at least one unknown is received by an analysis module. The analysis module may comprise hardware and software substantially as shown and described above.

Additionally, one or more of the analysis modules may be configured to receive a plurality of streaming sources simultaneously for analysis. It is contemplated that the analysis modules may be located and configured to receive and analyze a wide variety of content, including analog radio or video, digital streaming audio or video, or any other media.

In act 402, the analysis module then creates a representation of the received unknown work as shown and described above. The representation may be created by the analysis module by extracting psychoacoustic properties from the received unknown work as described above.

In act 404, the representations created by the one or more analysis modules may be provided to an ID server. The ID server may comprise hardware and software as described above. It is contemplated that the ID server may comprise a single server, multiple servers networked at a single location, or multiple servers located at different locations.

It is contemplated that the various analysis modules may provide representations to one or more ID servers in a wide variety of manners. For example, all of the analysis modules present in a system may provide representations in real-time. Or, different analysis modules may be configured to provide representations at different intervals depending on the needs of the end user. The analysis modules may transmit representations every sixty seconds, hourly, or as often as is needed.

In some cases where network connectivity is challenging, the representations may be batched up and sent to the ID server(s) once a day or less. In particularly harsh or secretive conditions, the representations may be stored within the analysis modules until the modules could be physically retrieved and operatively coupled to an ID server at another physical location.

It is contemplated that an out-of-band event may be used to trigger the transmission of representations. For example, such a trigger may comprise the initialization of a connection to a network, or the activation of media playing software or hardware.

Figure 5:
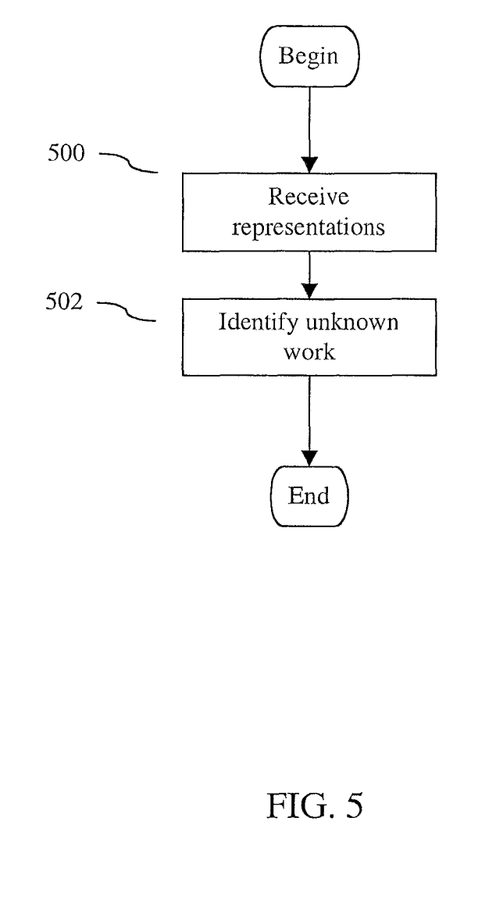
FIG. 5 is a flowchart of one aspect of a disclosed system.

FIG. 5 is a flowchart of a further disclosed aspect of a disclosed method. The process begins with act 500, where an ID server receives at least one representation of an unknown work. The representations may be received from analysis modules as described above.

In act 502, the ID server identifies the unknown work based upon the representation. This identification may be performed using the methods as described above. The identification may include such information as the song title, artist, label, or any other information as is known in the art that may be associated with the work. The identification information might contain information such as the name of the advertiser or a descriptive notation of an FCC broadcaster identification segment.

Once an identification of the unknown work is made, it is contemplated that a wide variety of further acts maybe performed. For example, the identifications made by the ID server may be used to construct or maintain a playlist database. Such a playlist may be stored on the ID server, or on a distant server. As will be appreciated by those skilled in the art, if representations are provided to the ID server in real-time (or near real-time depending on the equipment or network used), a playlist may be generated in corresponding real-time. Thus, a playlist may be generated in real-time from inputs provided from distant geographic locations or multiple sources that contains a comprehensive playlist of every identified media segment.

Additionally, the identification may be transmitted back to the analysis module which generated the representation. This may be advantageous where it is desired to generate a playlist for the particular analysis module's location or user. Thus, the ID server may be configured to provide an identification back to the source analysis module.

The identity of the received work may also be used for the maintenance of the system. Typically, copies of received works are stored on local drives for audit purposes. Since the intermediate representation files may be larger in size than the identities, it may be desirable to configure the analysis module to purge intermediate files for identified works to recover drive space. It is contemplated that the ID server may be configured to transmit the identity of received works back to the generating analysis module, and the corresponding representation files may then be deleted from local drives by the analysis module, thereby recovering valuable capacity.

Furthermore, it is contemplated that the ID server or analysis module may be configured to send information regarding identified works to third parties, such as third-party servers. Additionally, the ID server or analysis module may be configured to provide an electronic notification to third parties of identifications made by the ID server. Examples of electronic notifications may include email, HTTP POST transactions, or other electronic communication as is known in the art. As is known by those skilled in the art, these electronic notifications may be used to initiate an action based on their content. For example, such notifications may allow the playlist to be accessed in real-time or as desired.

It is contemplated that the ID server may be configured to provide customized playlists containing information tailored to a customer's individual needs. For example, a customer may wish to be notified whenever a certain work is broadcast, or whether a particular work is broadcast on a particular media outlet. Customers may wish to have complete playlists provided to them periodically at desired intervals that may include statistics known in the art. By using the system as disclosed herein, such requests may be satisfied automatically in real-time, or at whatever interval may be desired. It is to be understood that any of the aspects of the present disclosure may be performed in real time or as often as desired.

In some embodiments of this invention the received data may be divided into segments. For purposes of this discussion, a segment is an arbitrary portion of the data of the unknown work of a predetermined length. It is contemplated that the ID server may examine the representations of all segments that were not identified in the process described above, and determine that some sub-segments were actually performances of a single work. Furthermore, this examination may extract a plurality of other characteristics of the original broadcast such as the amount of musical content, amount of speech content, a transcription based on speech recognition, the beat of any music present etc. These characteristics of the unidentified segments can then be used to classify the unidentified unknown representations. For instance, a sub-segment that has been performed many times may be correlated with a high amount of musical content and a certain minimum length of play time to indicate that a new song has been detected. Correlating other values and characteristics could indicate that a new advertisement has been detected. In some cases a corresponding segment of the original broadcast signal could be retrieved and played for a human to perform an identification.

While embodiments and applications have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A system comprising:
a memory;
a processor coupled to the memory; and at least one analysis module executed from the memory by the processor to:
receive a portion of audio data of a broadcast signal, wherein the portion of audio data comprises a plurality of unknown works,
generate a segment representation of each of a plurality of segments from the portion of audio data, wherein the plurality of segments comprise portions of the plurality of unknown works,
transmit the segment representations over a network to an identification (ID) server, wherein the ID server is to identify the plurality of unknown works based on identifying one or more of the segment representations that correspond to one or more segments of a plurality of reference works, to generate separate playlists for two or more of the identified works, the separate playlists each identifying broadcast instances of a single identified work, and to output identification of the one or more of the segment representations that correspond to the one or more segments of the plurality of reference works responsive to identifying the one or more segment representations that correspond to the one or more segments of the plurality of reference works, and
purge the one or more segment representations that correspond to the one or more segments of the plurality of reference works responsive to receiving the identification of the one or more of the segment representations that correspond to the one or more segments of the plurality of reference works.

2. The system of claim 1, wherein the at least one analysis module further comprises an input port configured to receive the portion of audio data of the broadcast signal from a networked source.

3. The system of claim 1, wherein the at least one analysis module further comprises an input port configured to receive the portion of audio data of the broadcast signal from a broadcast source.

4. The system of claim 1, wherein the segment representations comprise feature vectors.

5. The system of claim 1, wherein the segment representations comprise spectral representations.

6. The system of claim 1, wherein the segment representations comprise text output of a speech recognition system.

7. The system of claim 1, wherein the segment representations comprise a musical score output of a music transcription system.

8. The system of claim 1, wherein the segment representations comprise bit calculated keys.

9. The system of claim 1, wherein said ID server is configured to identify the one or more of the segment representations that correspond to the one or more segments of the plurality of reference works using feature vectors.

10. The system of claim 1, wherein each of the segment representations comprise a spectral representation of a corresponding segment of the portion of audio data, and the ID server is configured to identify the one or more of the segment representations that correspond to one or more segments of the plurality of reference works using the spectral representations.

11. The system of claim 1, wherein the ID server is configured to identify the one or more of the segment representations that correspond to one or more segments of the plurality of reference works using bit calculated keys.

12. The system of claim 1, wherein the at least one analysis module is further configured to receive a plurality of portions of audio data of at least one broadcast signal for analysis at a single location.

13. The system of claim 1, wherein the at least one analysis module is further configured to receive a plurality of portions of audio data of at least one broadcast signal for analysis at a plurality of different access points of the network.

14. The system of claim 1, wherein the at least one analysis module is configured to transmit the segment representations to the ID server at a predetermined time interval.

15. The system of claim 1, wherein the at least one analysis module is configured to transmit the segment representations to the ID server responsive to receiving the portion of audio data of the broadcast signal and generating the segment representations.

16. The system of claim 1, wherein the at least one analysis module is configured to transmit the segment representations to the ID server based on an out-of-band event.

17. The system of claim 1, wherein the ID server is further configured to update one playlist of the separate playlists with the identification of the one or more of the segment representations that correspond to the one or more segments of the plurality of reference works responsive to identifying a broadcast instance of the single identified work that is associated with the one playlist.

18. The system of claim 1, wherein the broadcast signal comprises an analog broadcast signal, and the at least one analysis module is further to digitize the received portion of audio data.

19. The system of claim 1, wherein the portion of audio data comprises unknown portions of the plurality of unknown works with unknown boundaries between the plurality of unknown works.

20. A method comprising:
receiving, by a processor, a portion of audio data of a broadcast signal, wherein the portion of audio data comprises one or more unknown works;
generating, by the processor, a segment representation of each of a plurality of segments from the portion of audio data, wherein the plurality of segments comprise portions of the one or more unknown works;
sending, by the processor, the segment representations to an identification server over a network, wherein the identification server identifies the one or more unknown works based on identifying one or more segment representations that correspond to one or more segments of a plurality of reference works, generates separate playlists for each of the one or more identified works, the separate playlists each identifying broadcast instances of a different identified work, and outputs identification of the one or more segment representations that correspond to the one or more segments of the plurality of reference works responsive to identifying the one or more segment representations that correspond to the one or more segments of the plurality of reference works; and purging at least one file associated with the one or more segment representations that correspond to the one or more segments of the plurality of reference works responsive to receiving the identification of the one or more of the segment representations that correspond to the one or more segments of the plurality of reference works.

21. The method of claim 20, further comprising:
storing the identification of the one or more of the segment representations that correspond to one or more segments of the plurality of reference works in a playlist database.

22. The method of claim 20, further comprising:
sending, by the identification server, the identification of the one or more of the segment representations that correspond to one or more segments of the plurality of reference works to the processor.

23. The method of claim 20, wherein the network is the Internet.

24. The method of claim 20, wherein generating the representations comprises:
generating feature vectors of each of the plurality of segments from the portion of audio data.

25. The method of claim 20, wherein generating the segment representations comprises:
generating a spectral representation of each of the plurality of segments from the portion of audio data.

26. The method of claim 20, wherein generating the segment representations comprises:
generating a text output of each of the plurality of segments of the portion of audio data using a speech recognition system.

27. The method of claim 20, wherein the segment representations comprise a musical score output for each of the plurality of segments of the portion of audio data using a music transcription system.

28. The method of claim 20, wherein the segment representations comprise a bit calculated key for each of the plurality of segments of the portion of audio data.

29. The method of claim 20, wherein the identification server identifying the one or more unknown works comprises:
determining the identity of the one or more of the segment representations that correspond to one or more segments of the plurality of reference works using feature vectors in the segment representations.

30. The method of claim 20, wherein the identification server identifying the one or more unknown works comprises:
determining the identity of the one or more segment representations that correspond to one or more segments of the plurality of reference works using a spectral representation in each of the segment representations.

31. The method of claim 20, wherein the identification server identifying the one or more unknown works comprises:
determining the identity of the one or more of the segment representations that correspond to one or more segments of the plurality of reference works using a text output, in each of the segment representations, from a speech recognition system.

32. The method of claim 20, wherein the identification server identifying the one or more unknown works comprises:
determining the identity of the one or more of the segment representations that correspond to one or more segments of the plurality of reference works using a musical score output, in each of the segment representations, from a music transcription system.

33. The method of claim 20, wherein the identification server identifying the one or more unknown works comprises:
determining the identity of the one or more segment representations that correspond to one or more segments of the plurality of reference works using a bit calculated key in the segment representations.

34. The method of claim 20, wherein receiving the portion of audio data comprises:
receiving a plurality of portions of audio data of at least one broadcast signal for analysis at a single location.

35. The method of claim 20, wherein receiving the portion of audio data comprises:
receiving a plurality of portions of audio data of at least one broadcast signal for analysis at different access points of the network.

36. The method of claim 20, wherein sending the segment representations to the identification server comprises:
sending the segment representations responsive to generating the segment representations.

37. The method of claim 20, wherein the portion of audio data comprises unknown portions of the one or more unknown works with unknown boundaries.

38. The method of claim 20, wherein the broadcast signal comprises an analog broadcast signal, the method further comprising:
digitizing the received portion of the audio data.

39. A method comprising:
receiving a plurality of segment representations generated from a plurality of segments of a portion of audio data of a broadcast signal over a network, wherein the portion of audio data comprises a plurality of unknown works, and wherein the plurality of segments comprise portions of the plurality of unknown works;
identifying the plurality of unknown works based on identifying one or more of the segment representations that correspond to one or more segments of a plurality of reference works;
updating separate playlists for two or more of the identified works, the separate playlists each identifying broadcast instances of an associated identified work; and
outputting identification of the one or more segment representations that correspond to the one or more segments of the plurality of reference works responsive to identifying the one or more segment representations that correspond to the one or more segments of the plurality of reference works to enable a remote device to purge the one or more segment representations that correspond to the one or more segments of the plurality of reference works.

40. The method of claim 39, wherein the portion of audio data comprises unknown portions of the plurality of unknown works with unknown boundaries between the plurality of unknown works.

41. A system comprising:
a memory; and
a processor coupled to the memory, the processor comprising:

means for receiving a portion of audio data of a broadcast signal over a network, wherein the portion of audio data comprises a plurality of unknown works;

means for generating a representation of each of a plurality of segments from the portion of audio data, wherein the plurality of segments comprise portions of the plurality of unknown works; and means for sending the segment representations to an identification server over a network, wherein the identification server identifies the plurality of unknown works based on identifying one or more of the segment representations that correspond to one or more segments of a plurality of reference works, generates separate playlists for two or more of the identified works, the separate playlists each identifying broadcast instances of an associated identified work, and provides identification of the one or more of the segment representations that correspond to the one or more segments of the plurality of reference works responsive to identifying the one or more segment representations that correspond to the one or more segments of the plurality of reference works; and means for purging the one or more segment representations that correspond to the one or more segments of the plurality of reference works responsive to receiving the identification of the one or more of the segment representations that correspond to the one or more segments of the plurality of reference works.

42. The system of claim 41, further comprising:

means for storing the identification of the one or more of the segment representations that correspond to one or more segments of the plurality of reference works in a playlist database.

43. The system of claim 41, further comprising:

means for generating at least one of the separate playlists responsive to the identification of the one or more of the segment representations that correspond to one or more segments of a particular reference work.

44. The system of claim 41, further comprising:

means for updating at least one of the separate playlists responsive to the identification of the one or more of the segment representations that correspond to one or more segments of a particular reference work.

45. The system of claim 41, wherein the portion of audio data comprises unknown portions of the plurality of unknown works with unknown boundaries between the plurality of unknown works.

46. The system of claim 41, wherein the broadcast signal comprises an analog broadcast signal, the system further comprising:

means for digitizing the received portion of audio data.

47. A system comprising:

a memory; and a processor coupled to the memory, the processor comprising:

means for receiving a portion of audio data of a broadcast signal, wherein the portion of the audio data comprises a plurality of unknown works;

means for generating a segment representation of each of a plurality of segments from the portion of audio data;

means for sending the segment representations to an identification server over a network, wherein the identification server identifies the plurality of unknown works based on identifying one or more of the segment representations that correspond to one or more segments of a plurality of reference works, generates separate playlists for two or more of the identified works, the separate playlists each identifying broadcast instances of an associated identified work, and provides identification of the one or more of the segment representations that correspond to the one or more segments of the plurality of reference works responsive to identifying the one or more segment representations that correspond to the one or more segments of the plurality of reference works;

means for purging the one or more segment representations that correspond to the one or more segments of the plurality of reference works responsive to receiving the identification of the one or more of the segment representations that correspond to the one or more segments of the plurality of reference works; and means for sending an indication of the at least one of the identified works to at least one other computer system over the network.

* * * * *